(12) United States Patent
Borelli et al.

(10) Patent No.: US 7,930,600 B2
(45) Date of Patent: Apr. 19, 2011

(54) LOGICAL TO PHYSICAL CONNECTIVITY VERIFICATION IN A PREDEFINED NETWORKING ENVIRONMENT

(75) Inventors: Mario L. Borelli, Highland, NY (US);
Justin M. Spotts, Ulster Park, NY (US);
Tristan A. Tenyenhuis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/037,142

(22) Filed: Feb. 26, 2008

(65) Prior Publication Data

US 2009/0217103 A1    Aug. 27, 2009

(51) Int. Cl.
G06F 11/00 (2006.01)
(52) U.S. Cl. .......................................... 714/57; 709/224
(58) Field of Classification Search ...................... 714/57
See application file for complete search history.

(56) References Cited

U.S. PATENT DOCUMENTS

| | | | | |
|---|---|---|---|---|
| 5,265,241 | A * | 11/1993 | Arnold et al. .................... | 710/15 |
| 5,819,043 | A * | 10/1998 | Baugher et al. ............... | 709/222 |
| 6,748,451 | B2 * | 6/2004 | Woods et al. ................. | 709/248 |
| 7,181,578 | B1 | 2/2007 | Guha et al. | |
| 7,194,538 | B1 | 3/2007 | Rabe et al. | |
| 7,493,409 | B2 * | 2/2009 | Craddock et al. ............. | 709/238 |
| 7,631,064 | B1 * | 12/2009 | Gray ............................. | 709/224 |
| 2005/0044268 | A1 * | 2/2005 | Johnston-Watt et al. ...... | 709/238 |
| 2005/0060445 | A1 * | 3/2005 | Beukema et al. ............... | 710/52 |
| 2005/0100033 | A1 | 5/2005 | Arndt et al. | |
| 2006/0101220 | A1 | 5/2006 | Cohn | |
| 2008/0155216 | A1 * | 6/2008 | Shoham ........................ | 711/162 |

OTHER PUBLICATIONS

Nakamura, et al., Information Fusion for Wireless Sensor Networks: Methods, Models, and Classifications, ACM Computing Surveys, Aug. 2007, vol. 39, No. 3 Article 9.
Simmons, et al., Knowledge Sharing Between Distributed Knowledge Based Systems, p. 5.6.2.1, CH3129-4/92/0000-0701, 1992 IEEE, IPCCC, Texas USA.
Benini et al., System-Level Power Optimization: Techniques and Tools, ACM Transactions on Design Automation of Electronic Systems, Apr. 2000, pp. 115-192, vol. 5, No. 2.
Aizikowitz et al., Component-Based Performance Modeling of a Storage Area Network, Proceedings of the 2005 Winter Simulation Conference, 2005, pp. 2417-2426, Haifa Israel.

* cited by examiner

*Primary Examiner* — Scott T Baderman
*Assistant Examiner* — Kamini Patel
(74) *Attorney, Agent, or Firm* — Jon A. Gibbons; Fleit Gibbons Gutman Bongini & Bianco PL

(57) ABSTRACT

A method, information system, and computer readable storage medium verify predefined connectivity for I/O devices. Current predefined logical connection data and actual physical connection data is gathered. The predefined logical connection data and the actual physical connection data are formatted into a plurality of sortable tables. At least a portion of the predefined logical connection data is formatted into a predefined channels table and at least a portion of the actual physical connection data is formatted into a node information table. The portion of the predefined logical connection data is compared with the portion of the actual physical connection data. The portion of the predefined logical connection data is determined to substantially match/not match the portion of the actual physical connection data. At least one predefined logical connection associated with the predefined logical connection data that fails to substantially match the actual physical connection data is displayed to a user.

18 Claims, 8 Drawing Sheets

| PCHID 224 | Type 226 | CHPID 228 | LPAR count 230 | CSS-0 232 | CSS-1 234 | CSS-2 236 | CSS-3 238 | Switch 240 | CU count 242 | Control Units 244 | | | |
|---|---|---|---|---|---|---|---|---|---|---|---|---|---|
| 120 | FCP | 4D | 3 | | | | | | 1 | 3240(1) | | | |
| 121 | FC | 51 | 6 | 0 | 1 | 2 | 3 | 70 | 6 | 7600(0-1-2-3) | 7900(0-1-2-3) | 9000(0-2-3) | 9200(0-2-3) 9400(0-2-3) |
| 122 | FC | 6A | 6 | 0 | 1 | 2 | 3 | B5 | 24 | 6000(0) | 6780(0) | 6D00(0) | 7100(0) 9080(1-3) |
| 123 | FC | 89 | 6 | 0 | 1 | 2 | 3 | D6 | 2 | 4D00(0-1-2-3) | 0140(0-1-2-3) | | |
| 130 | FC | 56 | 6 | 0 | 1 | 2 | 3 | 70 | 24 | 0800(1) | 0840(1) | 0880(1) | 0B00(1) 0B40(1) |
| 131 | FC | 57 | 6 | 0 | 1 | 2 | 3 | C0 | 114 | 1000(0-1-2-3) | 1010(0-1-2-3) | 1020(0-1-2-3) | 1030(0-1-2-3) 1040(0-1-2-3) |
| 132 | FC | 6C | 1 | | | 2 | 3 | C2 | 1 | 8F80(2-3) | | | |
| 133 | FC | 6D | 1 | | | 2 | 3 | CA | 0 | | | | |
| 140 | FC | 59 | 6 | 0 | 1 | 2 | 3 | 70 | 38 | 3160(0-1-2-3) | 4210(0) | 4211(1) | 4212(2) 4213(3) |
| 141 | FC | 5B | 6 | 0 | 1 | 2 | 3 | CA | 12 | 9000(0-1-2-3) | 9200(0-1-2-3) | 9400(0-1-2-3) | 9600(0-1-2-3) D000(1-3) |
| 142 | FC | 70 | 6 | 0 | 1 | 2 | 3 | CA | 1 | 7B80(0-1-2-3) | | | |
| 143 | FC | 71 | 6 | 0 | 1 | 2 | 3 | 70 | 2 | 7F00(0-1-2-3) | 8000(3) | | |
| 160 | CNC | 09 | 9 | 0 | | | | 16 | 2 | 06F0(0) | 0016(0) | | |
| 161 | CNC | F3 | 9 | 0 | | | | 18 | 2 | 0EF0(0) | 0018(0) | | |
| 162 | CNC | 34 | 9 | 0 | | 2 | | 18 | 2 | 0EF0(0) | 0018(0) | | |
| 163 | CNC | 30 | 6 | 0 | | | | 18 | 1 | 05EC(2) | | | |
| 164 | CNC | D3 | 9 | 0 | | | | 33 | 4 | 02E4(0) | 0C64(0) | 2400(0) | |
| 165 | CNC | 08 | 9 | 0 | | | | 19 | 4 | 06F8(0) | 0019(0) | 2400(0) | |
| 166 | CNC | 2C | 9 | 0 | | | | 1C | 3 | 04EC(0) | 0FE8(0) | 2500(0) | |
| 167 | CNC | 1D | 10 | 0 | | | | 1C | 1 | 001C(0) | | | |
| 168 | CNC | 0A | 9 | 0 | | | | 33 | 3 | 02E4(0) | 0C64(0) | 0033(0) | |
| 503 | FC | 41 | 6 | 0 | 1 | 2 | 3 | B6 | 44 | 5800(0-1) | 5900(0-1) | 5A00(0-1) | 5B00(0-1) F700(0-1) |

| Control Unit Number | Attached PCHIDs | | | | |
|---|---|---|---|---|---|
| 0FA0.09 | 21,(70CD / 70CD / 70CD) | 280,(716F / 716F / 716F / 716F / 716F)1A,(716E / 716E / 716E / 716E / 716E)31,(70CE / 70CE / 70CE / 70CE) | | | 130,(70CD) |
| 1000.11 | 13,(6112 / 6112 / 632E / 632E) | | | | |
| 1004.11 | 30,(7004 / 7004 / 7111 / 7111) | | | | |
| 1010.12 | 13,(6112 / 6112 / 632E / 632E) | | | | |
| 1014.12 | 30,(7004 / 7004 / 7111 / 7111) | | | | |
| 1020.13 | 13,(6112 / 6112 / 632E / 632E) | | | | |
| 1024.13 | 30,(7004 / 7004 / 7111 / 7111) | | | | |
| 1030.14 | 13,(6112 / 6112 / 632E / 632E) | | | | |
| 1034.14 | 30,(7004 / 7004 / 7111 / 7111) | | | | |
| 1040.15 | 13,(6112 / 6112 / 632E / 632E) | | | | |
| 1044.15 | 30,(7004 / 7004 / 7111 / 7111) | | | | |
| 1050.16 | 13,(6112 / 6112 / 632E / 632E) | | | | |
| 1054.16 | 30,(7004 / 7004 / 7111 / 7111) | | | | |
| 1060.18 | 13,(6112 / 6112 / 632E / 632E) | | | | |
| 1064.18 | 30,(7004 / 7004 / 7111 / 7111) | | | | |
| 1070.19 | 13,(6112 / 6112 / 632E / 632E) | | | | |
| 1074.19 | 30,(7004 / 7004 / 7111 / 7111) | | | | |
| 1080.01 | 13,(6112 / 6112 / 632E / 632E) | | | | |
| 1084.01 | 30,(7004 / 7004 / 7111 / 7111) | | | | |
| 1090.02 | 13,(6112 / 6112 / 632E / 632E) | | | | |
| 1094.02 | 30,(7004 / 7004 / 7111 / 7111) | | | | |
| F700.1F | 122,(68A9* / 68C9*) | 5A2,(68C9 / 68A9) | 42,(6B62 / 6B62) | 45,(7123 / 7123) | 503,(69B9 / 69A9) |

FIG. 4

| Link | Total Number of Times a PCHID is Defined to a Link | PCHID(Defined Count) | | | | | | | | | |
|---|---|---|---|---|---|---|---|---|---|---|---|
| PTP | 189 | 511(4) | 311(3) | 200(16) | 210(16) | 43(5) | 631(5) | 550(5) | 430(5) | 111(4) | 110(4) |
| 70CD | 40 | 211(30) | 130(10) | | | | | | | | |
| 716F | 40 | 280(30) | 411(10) | | | | | | | | |
| 716E | 40 | 1A1(30) | 280(10) | | | | | | | | |
| 70CE | 40 | 331(30) | 3D1(10) | | | | | | | | |
| 6660 | 20 | 223(18) | 183(2) | | | | | | | | |
| 6BCB | 16 | 202(16) | | | | | | | | | |
| 6BCC | 16 | 543(16) | | | | | | | | | |
| 6661 | 20 | 483(18) | 302(2) | | | | | | | | |
| CB4B | 4 | 202(4) | | | | | | | | | |
| CB4C | 4 | 543(4) | | | | | | | | | |
| 6112 | 32 | 131(32) | | | | | | | | | |
| 632E | 80 | 131(80) | | | | | | | | | |
| 7004 | 32 | 301(32) | | | | | | | | | |
| 7111 | 80 | 301(80) | | | | | | | | | |
| 6167 | 32 | 131(32) | | | | | | | | | |
| 6331 | 76 | 131(76) | | | | | | | | | |
| 7087 | 60 | 301(32) | 140(28) | | | | | | | | |
| 7147 | 80 | 301(80) | | | | | | | | | |
| 6321 | 4 | 131(4) | | | | | | | | | |
| 6106 | 112 | 3B1(32) | 5B0(80) | | | | | | | | |

| PCHID 532 | LINK 534 | VALIDITY 536 | NODE TYPE | PROTOCOL | CLASS | LOGICAL INTERFACE |
|---|---|---|---|---|---|---|
| 0210 | 000D | Valid | Device | FC-SB-2 (1) | DASD (1) | 00 |
| 0603 | 6989 | Valid | Device | FC-SB-2 (1) | DASD (1) | 00 |
| 0131 | 6106 | Valid | Device | FC-SB-2 (1) | Switch (10) | 06 |
| 0503 | 69A9 | Valid | Device | FC-SB-2 (1) | DASD (1) | 00 |
| 01A2 | 6989 | Valid | Device | FC-SB-2 (1) | DASD (1) | 00 |
| 0603 | 6999 | Valid | Device | FC-SB-2 (1) | DASD (1) | 00 |
| 01A2 | 6999 | Valid | Device | FC-SB-2 (1) | DASD (1) | 00 |
| 0531 | 68B9 | Valid | Device | FC-SB-2 (1) | DASD (1) | 00 |
| 0503 | 69A9 | Valid | Device | FC-SB-2 (1) | DASD (1) | 00 |
| 0542 | 69A9 | Not Valid | | | | |
| 0503 | 69B9 | Not Valid | | | | |
| 0542 | 69B9 | Not Valid | | | | |
| 0322 | 6BBF | Valid | Device | FC-SB-2 (1) | DASD (1) | 00 |
| 03B3 | 6BBF | Valid | Device | FC-SB-2 (1) | DASD (1) | 00 |
| 0403 | 6BC0 | Valid | Device | FC-SB-2 (1) | DASD (1) | 00 |
| 03D3 | 6BC0 | Not Valid | | | | |
| 0322 | 6BC2 | Valid | Device | FC-SB-2 (1) | DASD (1) | 00 |
| 03B3 | 6BC2 | Valid | Device | FC-SB-2 (1) | DASD (1) | 00 |
| 0403 | 6BC5 | Valid | Device | FC-SB-2 (1) | DASD (1) | 00 |
| 03D3 | 6BC5 | Not Valid | | | | |
| 05C1 | 70C6 | Not Valid | | | | |
| 0620 | 70C7 | Not Valid | | | | |
| 01A0 | 70C7 | Not Valid | | | | |
| 0421 | 6B62 | Not Valid | | | | |
| 05C3 | 68C3 | Valid | Device | FC-SB-2 (1) | DASD (1) | 00 |
| 0613 | 68D3 | Valid | Device | FC-SB-2 (1) | DASD (1) | 00 |
| 0503 | 69C3 | Valid | Device | FC-SB-2 (1) | DASD (1) | 00 |
| 0533 | 69D3 | Valid | Device | FC-SB-2 (1) | DASD (1) | 00 |
| 0612 | B7C3 | Not Valid | | | | |
| 0623 | B7D3 | Valid | Device | FC-SB-2 (1) | DASD (1) | 00 |
| 05A3 | B8C3 | Valid | Device | Reserved (0) | Magnetic tape (2) | 00 |
| 05B1 | B8D3 | Valid | Device | FC-SB-2 (1) | Unspecified class (0) | 00 |

FIG. 5A

| TYPE # | MODEL # | MFTR. | PLANT | SEQUENCE NUMBER | TAG | CU NAME | LCU # |
|---|---|---|---|---|---|---|---|
| 002107 | 922 | IBM | 75 | 000000002621 | 0342 | 2E00 | 06 |
| 002107 | 922 | IBM | 75 | 000000002621 | 0000 | 5E00 | 0E |
| 0MDS9K | 513 | CSC | 01 | 000DEC2CA2C5 | 0006 | Nnode | |
| 002107 | 922 | IBM | 75 | 000000002621 | 0002 | F700 | 1F |
| 002107 | 922 | IBM | 75 | 000000002621 | 0000 | 5E00 | 0E |
| 002107 | 922 | IBM | 75 | 000000002621 | 0001 | 5E00 | 0E |
| 002107 | 922 | IBM | 75 | 000000002621 | 0001 | 5E00 | 0E |
| 002107 | 922 | IBM | 75 | 000000002621 | 0103 | 5E00 | 0E |
| 002107 | 922 | IBM | 75 | 000000002621 | 0002 | 5E00 | 0E |
| | | | | | | 5E00 | 0E |
| | | | | | | 5E00 | 0E |
| | | | | | | 5E00 | 0E |
| 002107 | 922 | IBM | 75 | 000000002621 | 0012 | 5E00 | 0E |
| 002107 | 922 | IBM | 75 | 000000002621 | 0012 | 5E00 | 0E |
| 002107 | 922 | IBM | 75 | 000000002621 | 0041 | 5E00 | 0E |
| | | | | | | 5E00 | 0E |
| 002107 | 922 | IBM | 75 | 000000002621 | 0013 | 5E00 | 0E |
| 002107 | 922 | IBM | 75 | 000000002621 | 0013 | 5E00 | 0E |
| 002107 | 922 | IBM | 75 | 000000002621 | 0040 | 5E00 | 0E |
| | | | | | | 5E00 | 0E |
| | | | | | | 5E00 | 0E |
| | | | | | | 5E00 | 0E |
| | | | | | | 5E00 | 0E |
| | | | | | | F700 | 1F |
| 002105 | F20 | EMC | 07 | 100000000258 | 000C | DF80 | 1F |
| 002105 | F20 | EMC | 07 | 100000000258 | 008E | DF80 | 1F |
| 002105 | F20 | EMC | 07 | 100000000258 | 0002 | DF80 | 1F |
| 002105 | F20 | EMC | 07 | 100000000258 | 0086 | DF80 | 1F |
| | | | | | | DF80 | 1F |
| 002105 | F20 | EMC | 07 | 100000000258 | 008C | DF80 | 1F |
| 003490 | C2A | IBM | 78 | 000000319000 | 0301 | DF80 | 1F |
| 003868 | 003 | IBM | PK | 05738204128A | 0111 | DF80 | 1F |

FIG. 5B

LOGICAL TO PHYSICAL CONNECTIVITY VERIFICATION IN A PREDEFINED NETWORKING ENVIRONMENT

FIELD OF THE INVENTION

The present invention generally relates to the field of predefined networking environments, and more particularly relates to verifying logical to physical connectivity within a networking environment.

BACKGROUND OF THE INVENTION

One current limitation found in many network computing environments is the ability to easily and accurately verify the physical and logical connectivity as described by their static definition. Such a limitation has plagued generations of system owners. Typically, in order to acquire the necessary data to begin verification, data collection is generally performed by the various directors, usually from an array of different vendors. Current tools provide the system owner with information associated with the actual physical connections. However, this still leaves the task of ensuring the logical definitions to the customer. Current tools outside the processor generally do not have access to the static definition file, which makes it difficult to correlate the physical to logical connectivity.

Therefore a need exists to overcome the problems with the prior art as discussed above.

SUMMARY OF THE INVENTION

Disclosed is a method for verifying predefined connectivity for I/O devices. The method includes gathering current predefined logical connection data associated with an information processing system. Actual physical connection data associated with the information processing system is also gathered. The predefined logical connection data and the actual physical connection data is formatted into a plurality of sortable tables. At least a portion of the predefined logical connection data is formatted into a predefined channels table and at least a portion of the actual physical connection data is formatted into a node information table. The portion of the predefined logical connection data in the predefined channels table is compared with the portion of the actual physical connection data in the node information table in response to the formatting. The portion of the predefined logical connection data is determined to either substantially match or not substantially match the portion of the actual physical connection data based on the comparing. At least one predefined logical connection that is associated with predefined logical connection data that fails to substantially match the actual physical connection data to a user and/or ii) substantially matches the actual physical connection data is displayed to a user.

In another embodiment, an information processing system for verifying predefined connectivity for I/O devices is disclosed. The information processing system includes a memory and a processor communicatively coupled to the memory. The information processing system also includes a connectivity verification module that is communicatively coupled to the memory and processor. The connectivity verification module is adapted to gather current predefined logical connection data associated with an information processing system. Actual physical connection data associated with the information processing system is also gathered. The predefined logical connection data and the actual physical connection data is formatted into a plurality of sortable tables. At least a portion of the predefined logical connection data is formatted into a predefined channels table and at least a portion of the actual physical connection data is formatted into a node information table. The portion of the predefined logical connection data in the predefined channels table is compared with the portion of the actual physical connection data in the node information table in response to the formatting. The portion of the predefined logical connection data is determined to either substantially match or not substantially match the portion of the actual physical connection data based on the comparing. At least one predefined logical connection that is associated with predefined logical connection data that fails to substantially match the actual physical connection data to a user and/or ii) substantially matches the actual physical connection data is displayed to a user.

In yet another embodiment, a computer readable storage medium for verifying predefined connectivity for I/O devices is disclosed. The computer readable storage medium includes instructions for gathering current predefined logical connection data associated with an information processing system. Actual physical connection data associated with the information processing system is also gathered. The predefined logical connection data and the actual physical connection data is formatted into a plurality of sortable tables. At least a portion of the predefined logical connection data is formatted into a predefined channels table and at least a portion of the actual physical connection data is formatted into a node information table. The portion of the predefined logical connection data in the predefined channels table is compared with the portion of the actual physical connection data in the node information table in response to the formatting. The portion of the predefined logical connection data is determined to either substantially match or not substantially match the portion of the actual physical connection data based on the comparing. At least one predefined logical connection that is associated with predefined logical connection data that fails to substantially match the actual physical connection data to a user and/or ii) substantially matches the actual physical connection data is displayed to a user.

One advantage of the various embodiments of the present invention is that logical to physical connectivity within a networking environment can be verified. Connectivity information can be presented to a user from various perspectives such as from a channel, a control unit, a node, a link, and other perspectives. Connectivity information can be formatted into sortable tables so that a user can identify any misconfigurations, over utilization of resources, single points of failure, or other problems with the predefined logical-to-physical connections. Another advantage is that broken paths can be identified from the physical perspective as compared to the logical perspective of the individual operating systems.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIGS. 2-5B show examples of various tables that are populated with connectivity related information according to one embodiment of the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Computing Environment

Figure 1:
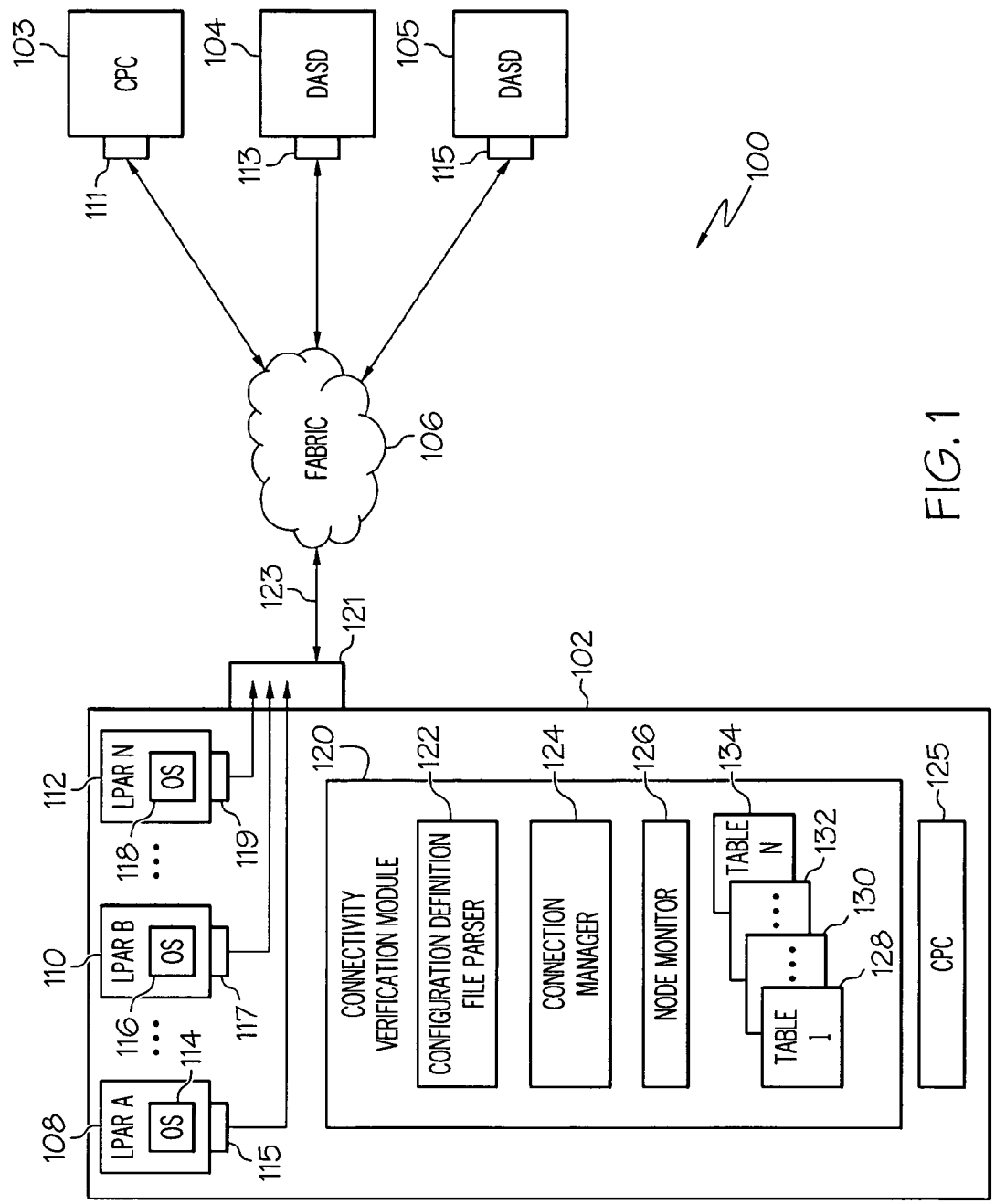
FIG. 1 is a block diagram illustrating one example of a computing environment according to one embodiment of the present invention.

FIG. 1 shows one example of a computing environment 100, which embodiments of the present invention may be implemented. It should be noted that the present invention is applicable to both single system and distributed computing environments. In one embodiment, the computing environment 100 is a single SMP computing environment with a plurality of logical partitions in which an operating system image is instantiated. In an SMP computing environment, parallel applications can have several tasks (processes) that execute on the various processors on the same processing node.

In particular, FIG. 1 shows one or more information processing systems 102 communicatively coupled to one or more devices 103, 104, 105 via a fabric 106 such as a switch. A physical channel adapter 121 communicatively coupled the information processing system 102 to the fabric 106 via one or more logical/physical connections 123. The devices 103, 104, 105 also include a physical channel adapter 111, 113, 115 that communicatively couple the devices 103, 104, 105 to the fabric 106.

It should be noted that although only a single information processing system 102 and a single fabric 106 is shown, multiple information processing systems and multiple fabrics can be included within the computing environment 100 of FIG. 1. The information processing system 102, in one embodiment, is in a mainframe such as the System Z™ from International Business Machine, a personal computer, or any other type of computing device. The devices 103, 104, 105 in one embodiment can be, a central processing complex ("CPC"), a storage device, or any other type of I/O device that logical partitions within the information processing system 102 are defined to communicate with.

The information processing system, in one embodiment, includes one or more CPCs 125 and a plurality of processing nodes 108, 110, 112, which are referred fro hereon in as logical partition ("LPAR") 108, 110, 112. Each LPAR 108, 110, 112 is independent with its own operating system image 114, 116, 118. Each LPAR 108, 110, 112 shares a plurality of processing units (not shown) in a manner referred to as micro-partitioning where processing units can be time sliced by a hypervisor (not shown) on the same processing unit (not shown). In other embodiments, the processors (not shown) do not have to be shared. Each of the LPARs 108, 110, 112 include a logical channel adapter 115, 117, 119 that is communicatively coupled to the local physical channel adapter 123 of the information processing system 102.

In one embodiment, the information processing system 102 also includes a connectivity verification module 120. The connectivity verification module 120 verifies predefined logical to physical connections associated with the information processing system 102. The connectivity verification module 120, in one embodiment, includes a configuration definition file parser 122, a connection manager 124, a node monitor 126, and a plurality of tables 128, 130, 132, 134 for storing connectivity related information. The connectivity verification module 120, configuration definition file parser 122, a connection manager 124, a node monitor 126, and a plurality of tables 128, 130, 132, 134 are discussed in greater detail below.

Logical to Physical Connectivity Verification

As discussed above, current connectivity verification tools only provide a user with information associated with actual physical connections. In other words, these tools are generally only directed at the fabric 106. These tools do not provide any connectivity information associated with the logical connections defined at the information processing system. Various embodiments of the present invention, on the other hand, provide both logical and physical connectivity data to a user. Furthermore, the various embodiments of the present invention analyze the logical and physical connectivity data to determine whether the accuracy of the predefined logical-to-physical paths. A user or administrator is then notified accordingly.

The connectivity verification module 120, in one embodiment, gathers current logical definition data as defined for the information processing system 102. For example, to define I/O on the information processing system 102, a configuration definition file is created that includes configuration data associated with a host processor or logical partition for channel connections. The configuration definition file is generally made available to the LPARs 108, 110, 112 to inform them of the resources that each LPAR can connect to. The configuration definition file parser 122, in one embodiment, extrapolates relevant information from the configuration definition file and correlates the data from the channel to the end communication device (such as the device 104 shown in FIG. 1). In one embodiment, the configuration definition file parser 122 places the gathered information into various tables 128, 130, 132, 134 which are discussed in greater detail below.

For example, each path has a specific link that is defined out to a specific control unit. The configuration definition file parser 122, in one embodiment, takes a particular channel, which is identified by a Channel Path Identifier ("CHPID"), and "walks" through a link to extrapolate the devices that an LPAR can communicate with over that link. As the configuration definition file parser 122 parses through a configuration definition file it sorts the pathing data within the file, in one embodiment, by types. The configuration definition file parser 122 then draws logical end-to-end connections and fills abstract data types within the tables 128, 130, 132, 134.

After the extrapolation process for the logical connectivity data has been completed, the connectivity verification module 120 determines if the information processing system 102 is in a valid state so that physical connectivity data can be gathered. For example, the connection manager 124 determines whether the channels that are to be verified are logged into their respective fabric. In other words, in order to obtain the physical connectivity data, the information processing system 102 needs to be in a state where physical connectivity information can be obtained (such as an Initial Machine Load ("IML") complete stated) and all of the LPARs 108, 110, 112 need to be activated (e.g., on-line). Once a valid state is confirmed, the connectivity verification module 120 is able to obtain physical link status for all of the links. For example, the node monitor 126 gathers node ID information for the various types of I/O on the information processing system 102. Physical connectivity information is generally obtained when the channels come on-line and request the node IDs associated with the nodes that are defined to communicate with. This information is then stored within a storage system associated with the information processing system 102. The node monitor 126, in one embodiment, then gathers this physical connectivity data from the storage system.

In one embodiment, neighbor node and remote node information is gathered by the node monitor 126 for the physical connectivity information. A neighbor node is a node that the fiber (e.g., fabric 106) of the information processing system is "plugged" directly into. A remote node is any other node that is not "plugged" directly into the fiber and that the information processing system 102 is defined to communicate with. The node monitor 126, in one embodiment, gathers current I/O state information associated with the nodes. For example, the node monitor 126 determines if a node is available or not available. The node monitor 126 also gathers unique identifier information associated with each node such as (but not limited to) serial number, model number, machine type, and sequence number. By gathering logical connectivity data and physical connectivity data, channel paths can be verified from end-to-end and connectivity can be ensured.

Once the node monitor 126 has gathered the relevant physical connectivity data, the connectivity verification module 120 validates the pathing information. For example, the connectivity verification module 120 links the actual physical connection data with the pre-defined logical connectivity data. This allows the connectivity verification module 120 to draw the actual end-to-end connections so that any connectivity misconfigurations can be detected and so that the accuracy of the pre-defined logical connections can be determined. Stated differently, the various embodiments of the present invention correlate the logical perspective with the physical perspective to give users the ability to see the accuracy of the pre-defined logical connections. Information such as cabling mistakes, definition errors, device readiness, resource utilization, single point of failures, and lack of connectivity can all be identified by a user based on the information provided from the connectivity verification module 120.

FIGS. 2-5B show examples of the tables 128, 130, 132, 134 discussed above and how these tables can be used to determine the accuracy of the pre-defined logical connections. The configuration definition file parser 122 builds the tables 128, 130, 132, 134 based on various perspectives. For example, a table can be built from the perspective of a channel, a control unit, a node, a link, and other various perspectives. One advantage of the configuration definition file parser 122 is that the tables that are built place all of the relevant information in an easy to read format that is searchable so that a user can identify any misconfigurations or other problems with the predefined logical-to-physical connections.

FIG. 2 shows an example of a table 200 that is populated by the configuration definition file parser 122. For example, the configuration definition file parser 122 uses the information gathered from a configuration definition file to populate the table 200. The table 200 includes a first column 202 labeled "PCHID", which includes entries such as entry 224 that identify a particular physical channel via an identifier. A second column 204 labeled "Type" includes entries such as entry 226 that identify the type of channel associated with the corresponding channel under the "PCHID" column 202. For example, a channel can be a fiber channel.

A third column 206 labeled "CHPID" includes entries such as entry 228 that identify the logical channel path within a channel subsystem associated with the corresponding channel under the "PCHID" column 202. A fourth column 208 labeled "LPAR count" includes entries such as entry 230 that identify how many logical partitions have access to that channel. For example, the channel associated with PCHID 120 is accessible to three LPARs. The fifth column 210 to the eight column 216 respectively labeled "CSS-0", "CSS-1", "CSS-2", "CSS-3" includes entries such as entries 232, 234, 236, 238 that identify which logical channel subsystem a physical channel is associated with. A ninth column 218 includes entries such as entry 240 that associate a handle the switch associated with the corresponding channel under the "PCHID" column 202. A tenth column 220 includes entries such as entry 242 that identify the number of control units defined to communicate with the corresponding channel under the "PCHID" column 202. An eleventh column 222 includes entries such as entry 244 that identify the control unit name and the CSS that the corresponding channel under the "PCHID" column 202 is allowed to communicate with. For example, entry 244 shows that the channel with PCHID 120 is allowed to communicate with Control Unit 3240 in the Logical Channel Subsystem 1. In another embodiment, the table 200 can include a bitmask or representation of the actual LPAR associated with a physical channel. The bitmask can be assigned to the channel and the control unit so that a user can identify which specific LPAR within a CSS has access to the channel.

FIG. 3 is another example of a table 300 that is created from the control unit perspective and identifies the links. For example, the table 300, in one embodiment, includes a first column 302 labeled "Control Unit Number", which includes entries such as entry 306 that identify a particular control unit. A second column 304 labeled "Attached PCHIDs", which includes entries such as entry 308 that identify a PCHID associated with the corresponding control unit under the first column 302 and which CSS the PCHID is using. For example, entry 306 identifies a control unit OFA0.09 associated with PCHID 211 that uses link 70CD in all CSSs that PCHID 211 is defined for. As discussed above, the information included in the tables 200, 300 shown in FIGS. 2-3 are gathered by the configuration definition file parser 122 from the configuration definition file.

FIG. 4 is another example of a table 400 created by the configuration definition file parser 122. In particular, the table 400 of FIG. 4 includes a first column 402 labeled "Link" that includes entries such as entry 408 that identify a particular link. For example, entry 408 shows that a link in the fabric labeled 70CD exists. The table 400 also includes a second column 404 labeled "Total Number of Times a PCHID is Defined to a Link" that includes entries such as entry 410 that identify the number of times a corresponding link is defined from the logical perspective. For example, entry 410 shows that one or more PCHIDS have been defined to the link 70CD 40 times. The table 400 also includes a third column 406 labeled "PCHID (Defined Count)" that includes entries such as entry 412 that identify the PCHID using the corresponding link and how many times the PCHID logically uses that link. For example, entry 412 shows that PCHID 211 is logically defined over link 70CD 30 times.

FIGS. 5A-5B show another table 500 that is created by the connectivity verification module 120. In particular, the table 500 of FIGS. 5A-5B is created by the node monitor 126 by gathering physical connectivity data, as discussed above. The table 500 includes a first column 502 (FIG. 5A) labeled "PCHID" that includes entries such as entry 532 that identifies a particular PCHID. The table 500 includes a second column 504 (FIG. 5A) labeled "Link" that includes entries such as entry 534 that identifies link associated with the corresponding PCHID under the first column 502. For example, entry 534 shows a link 6989, which comprises the switch domain ID 69 and the actual link 89. The table 500 includes a third column 506 (FIG. 5A) labeled "Validity" that includes entries such as entry 536 that identifies whether the particular physical channel under the first column 502 is "valid" or "not valid". The fourth column 508 (FIG. 5A) through the fifteenth column 530 provides various types of information about a node. For example, information such as node type, protocol, class, logical interface, type number, model number, manufacturer, plant, sequence number, tag, control unit name, and LCU number, can all reside within the table 500. It should be noted that one or more types of information can be added or deleted to the table 500. All of the data that is retrieved when gathering the physical connectivity data is generally in a computer readable format. The connectivity verification module 120 converts this HEX data into a user-readable format.

The table shows data associated with neighbor nodes and remote nodes. With respect to a neighbor node, the third row 538 of the table 500 can be taken as one example. The third row 538 shows that PCHID 131 is going into switch domain 61 link 06, and the current link state is valid. The table 500 shows that PCHID 131 is plugged into a device that supports the FC-SB-2 architecture and the device is a switch. In other words, the logical port 06 is in that particular switch. The table 500 gives the user the type and number model number of the switch; the manufacturer of the switch; the plant that the switch was made in was made in; the sequence number or serial number associated with the switch; and the TAG field, which is the physical interface that the particular PCHID is plugged into on the switch.

With respect to a remote node, the fourth row 540 can be used as one example. The fourth row 540 shows that a channel with a PCHID identifier of "503" is associated with a link 69A9, which is the outbound link that the channel "503" is communicating with that domain ID. The fourth row 540 also includes the node type, protocol, class, logical interface, type number, model number, manufacturer, plant, sequence number, and tag information discussed above. The fourth row 540 also includes control unit and LCU info, of the remote node. It should be noted that these two fields are obtained from the configuration data file and are not sent from the remote node ID.

The PCHID information in the table 500 of FIGS. 5A-5B is used to map the physical connectivity information of the table 500 to the logical connectivity information in the corresponding logical connectivity tables. For example, returning to FIG. 2, the last row of FIG. 2 246 shows that PCHID "503" is associated with the control unit "F700". Returning to FIG. 3, the last row 310 also shows control unit "F700.1F" being associated with PCHID "503" and that PCHID "503" uses link 69B9 and 69A9. In other words, PCHID "503" uses two different links out to the fabric 106 (such as a switch) to get to the same control unit. Retuning to FIGS. 5A-5B, the table 500 at the fourth row 540 shows that PCHID "503" uses link 69A9 and is associated with control unit F700. As can be seen, the various tables presented above provide logical and physical connectivity information from different perspectives.

Furthermore, the table 300 of FIG. 3 shows the entry 312 comprising "503. (69B9/69A9)" as being shaded with diagonal lines. This indicates to a user that the link 69B9/69A9 out to the control unit F700 for PCHID 503 is valid. On the other hand, entry 314 comprising "421. (6B62/6B62)" is shaded with vertical lines. This indicates to a user that link 6B62/6B62 out to the control unit F700 is not valid for PCHID 421. The table 500 of FIGS. 5A-5B confirms this "not valid" state at the twenty-fourth row 542. It should be noted that only shading was shown for entries 312 and 314 for simplicity. All of the other entries also indicate to a user via graphical/visual indicator or whether a link is valid or not valid. It should also be noted that the present invention is not limited to using shading as a way of notifying a user of link status and other pertinent information. For example, graphics, animation, audio, color, or any other notification means can be used.

In addition to broken links, the tables discussed above also reveal misconfigurations. A control unit, in one embodiment, can only be one physical entity in a network environment such as a Storage Area Network ("SAN"). If sequence numbers for the control unit do not match, a misconfiguration has occurred. Therefore, the connectivity verification module 120 identifies any mismatched sequence numbers for a control unit and notifies the user. Taking the control unit DF80 as an example, the table 500 of FIGS. 5A-5B at the twenty-fifth row 544 to the thirty-second row 546 in FIG. 5B shows that a misconfiguration has occurred with respect to control unit DF80. As can be seen, entries 548 to 562 in FIG. 5B under the column labeled "CU Name" (Control Unit Name) 528 are shaded with a horizontal pattern. This indicates to a user that a misconfiguration has occurred. For example, the first five sequence numbers match, but the next two sequence numbers do not match with the others. This is important for a user to know because data is possibly being read or written to a location where it is not supposed to be. One advantage of the various embodiments of the present invention is that the broken path and can be identified from the physical perspective as compared to the perspective of the individual operating systems.

As can be seen from the above discussion, the various embodiments of the present invention provide an overall view of the connectivity in an operating environment from both the logical and physical connectivity perspectives. The various embodiments gather both the logical connectivity data and the physical connectivity data and place this data into a user-readable format. Critical information such as valid links, links that are not valid, misconfigurations, and other information is displayed to a user in a single location. Various visual indicators can be used to help a user identify any problems with the connectivity definitions. Alternatively, an automated process can display reports, graphics, text, audio, or any combination thereof to a user so that the user does not need to search through the tables.

Operational Flow for Verifying Predefined Logical to Physical Connections

Figure 6:
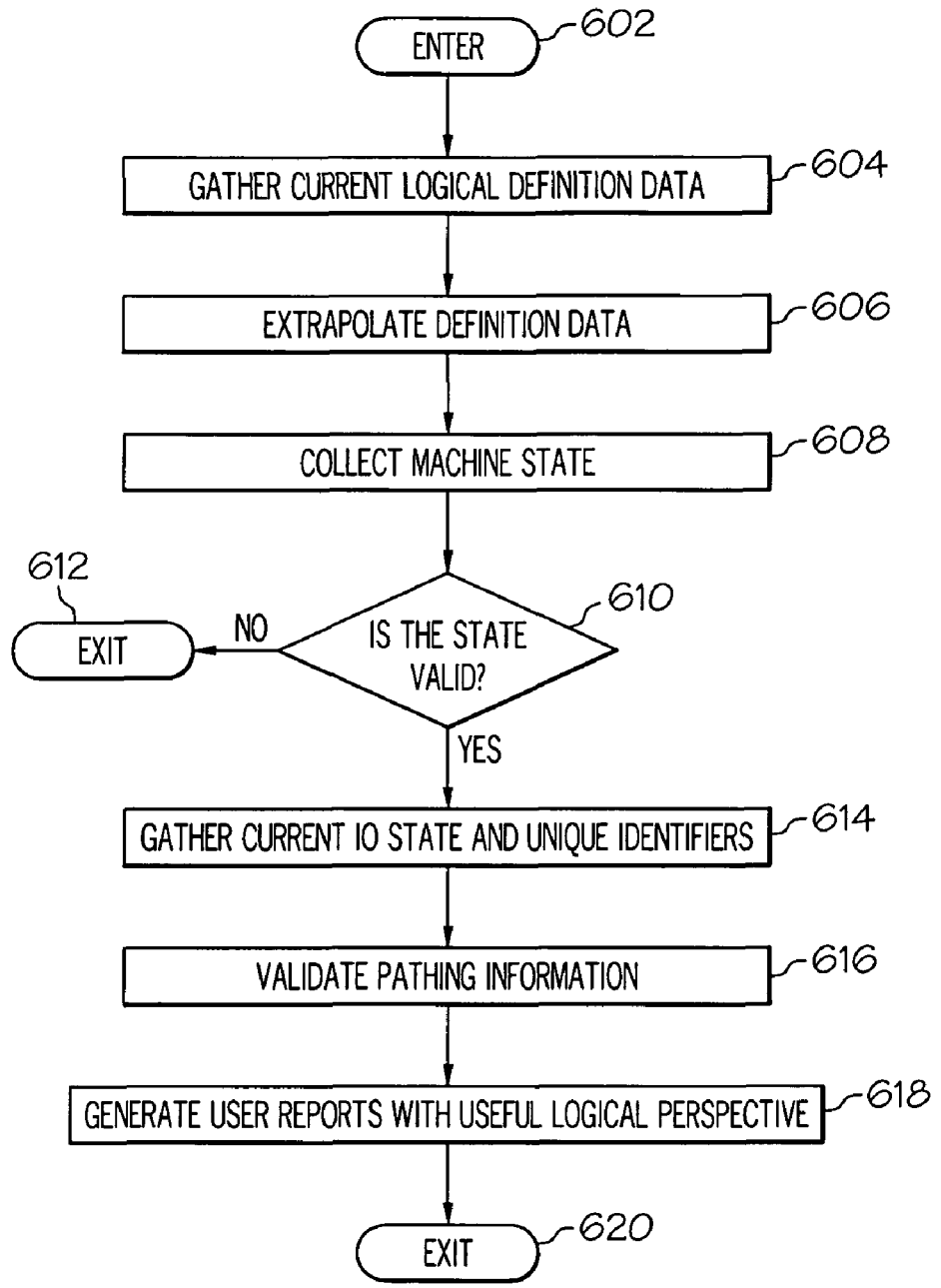
FIG. 6 is an operational flow diagram illustrating an overall process of verifying predefined logical to physical connections in a networking environment according to one embodiment of the present invention.

FIG. 6 is an operational flow diagram illustrating one example of verifying predefined logical to physical connections in a networking environment. The operational flow diagram of FIG. 6 begins at step 602 and flows directly to step 604. The connectivity verification module 120, at step 604 gathers current logical definition data. For example, the connectivity verification module 120 retrieves the configuration definition file for the system 102. The connectivity verification module 120, at step 606, extrapolates definition data from the configuration definition file. During the extrapolation process, the connectivity verification module 120 sorts pathing data by types and determines the logical end-to-end connections associated with the system 102, as discussed above. The connectivity verification module 120 also fills abstract data types with the logical end-to-end connection information.

Once the logical end-to-end information has been obtained, the connectivity verification module 120, at step 608, determines the state of the information processing system 102. The connectivity verification module 120, at step 610, determines if the state is valid. For example, the connectivity verification module 120, determines if the information processing system 102 is in a state where physical connectivity information can be obtained (such as an Initial Machine Load ("IML")). If the result of this information is negative, the control flow then exits at step 612.

If the result of this determination is positive, the connectivity verification module 120, at step 614, gathers current IO state and unique identifiers as discussed above with respect to table 500 of FIGS. 5A-5B. The connectivity verification module 120, at step 616, validates the pathing information. For example, the connectivity verification module 120 links the actual configuration to the defined configuration. The connectivity verification module 120 then draws actual end-to-end connections and overlays the logical end-to-end connections with the actual end-to-end connections. This allows the connectivity verification module 120 to identify any broken links and/or misconfigurations as discussed above. The connectivity verification module 120, at step 618, generates user reports with useful logical perspectives. For example, the connectivity verification module 120 can generate reports that show the status of links, misconfigurations, and other information relating the logical to physical connectivity of the networking environment.

Example of an Information Processing System

Figure 7:
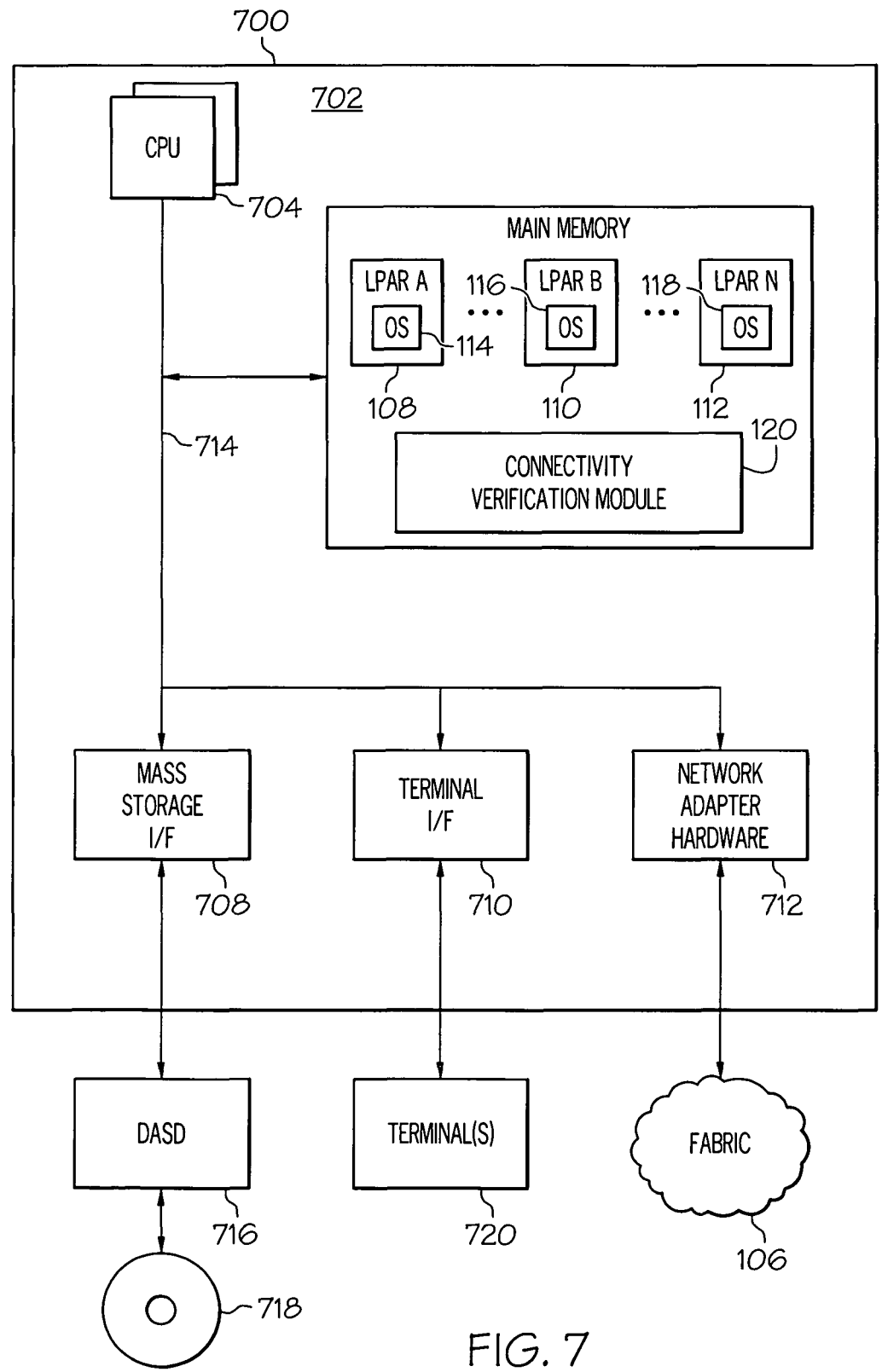
FIG. 7 is a block diagram illustrating a detailed view of an information processing system according to an embodiment of the present invention.

FIG. 7 is a block diagram illustrating a detailed view of an information processing system 700 such as the information processing system 102 of FIG. 1. The information processing system 700 is based upon a suitably configured processing system adapted to implement one embodiment of the present invention, according to the present example. Any suitably configured processing system is similarly able to be used as the information processing system 700 by various embodiments of the present invention such as a personal computer, a workstation, or the like.

The information processing system 700 includes a computer 702. The computer 702 has a processor 704 that is connected to a main memory 706, mass storage interface 708, terminal interface 710, and network adapter hardware 712. A system bus 714 interconnects these system components. The mass storage interface 708 is used to connect mass storage devices, such as data storage device 716, to the information processing system 700. One specific type of data storage device is a data drive capable of writing to/reading from a computer readable medium such as (but not limited to) a floppy disk, flash memory, or CD/DVD 718. Another type of data storage device is a data storage device configured to support, for example, NTFS type file system operations, ECKD DASD, or any other type of file system operations.

The main memory 706, in one embodiment, includes the LPARS 108, 110, 112 and the connectivity verification module 120 as discussed above. Although illustrated as concurrently resident in the main memory 706, it is clear that respective components of the main memory 706 are not required to be completely resident in the main memory 706 at all times or even at the same time. In one embodiment, the information processing system 700 utilizes conventional virtual addressing mechanisms to allow programs to behave as if they have access to a large, single storage entity, referred to herein as a computer system memory, instead of access to multiple, smaller storage entities such as the main memory 706 and data storage device 716. Note that the term "computer system memory" is used herein to generically refer to the entire virtual memory of the information processing system 700.

Although only one CPU 704 is illustrated for computer 702, computer systems with multiple CPUs can be used equally effectively. Various embodiments of the present invention further incorporate interfaces that each includes separate, fully programmed microprocessors that are used to off-load processing from the CPU 704. Terminal interface 710 is used to directly connect one or more terminals 720 to computer 702 to provide a user interface to the computer 702. These terminals 720, which are able to be non-intelligent or fully programmable workstations, are used to allow system administrators and users to communicate with the information processing system 700. The terminal 720 is also able to consist of user interface and peripheral devices that are connected to computer 702 and controlled by terminal interface hardware included in the terminal interface 710 that includes video adapters and interfaces for keyboards, pointing devices, and other devices/interfaces.

An operating system (not shown) included in the main memory is a suitable multitasking operating system such as the z/OS, AIX, Linux, UNIX, Windows XP, and Windows Server 2001 operating systems. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 700. The network adapter hardware 712 such as the physical channel adapter 121 discussed above is used to provide an interface to the fabric 106. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 718, CD ROM, or other form of recordable media, or via any type of electronic transmission mechanism.

NON-LIMITING EXAMPLES

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for verifying predefined connectivity for I/O devices, the method comprising:
    gathering current predefined logical connection data associated with an information processing system;
    analyzing a current state of the information processing system;
    determining, based on the analyzing, that the current state of the information processing system indicates that the information processing system is in a state where physical connectivity information can be gathered;
    gathering, in response to the determining, actual physical connection data associated with the information processing system;
    formatting the predefined logical connection data and the actual physical connection data into a plurality of sortable tables, wherein at least a portion of the predefined logical connection data is formatted into a predefined channels table and at least a portion of the actual physical connection data is formatted into a node information table;
    comparing, in response to the formatting, the portion of the predefined logical connection data in the predefined channels table with the portion of the actual physical connection data in the node information table;
    determining, based on the comparing, if the portion of the predefined logical connection data substantially matches the portion of the actual physical connection data; and
    displaying, in response to the determining, at least one predefined logical connection that is associated with predefined logical connection data that: i) fails to substantially match the actual physical connection data to a user and/or ii) substantially matches the actual physical connection data to a user.

2. The method of claim 1, wherein the gathering actual physical connection data further comprises:
    extracting the predefined logical connection data from a configuration definition file that defines a set of logical connections associated with a system.

3. The method of claim 1, wherein the gathering actual physical connection data further comprises:
    querying at least one node communicatively coupled to the information processing system for at least one of unique identifier information and current state information.

4. The method of claim 3, wherein the at least one node is one of a neighbor node and a remote node.

5. The method of claim 1, wherein the comparing further comprises:
    determining that at least one communication link associated with the information processing system is broken; and
    updating the predefined channels table to indicate that the communication link is broken.

6. The method of claim 1, wherein the comparing further comprises:
    determining that a misconfiguration exists with respect to a control unit associated with the information processing system; and
    updating the node information table to indicate that the misconfiguration exists.

7. The method of claim 1, wherein the displaying further comprises:
    displaying at least one of the plurality of sortable tables to the user, wherein the at least one of the plurality of sortable tables identifies the predefined logical connection that is associated with predefined logical connection data that fails to substantially match the actual physical connection data to a user using a visual indicator.

8. An information processing system for verifying predefined connectivity for I/O devices, the information processing system comprising:
    a memory;
    a processor communicatively coupled to the memory; and
    a connectivity module communicatively coupled to the memory and the processor, wherein the connectivity module is adapted to:
        gather current predefined logical connection data associated with an information processing system;
        sorting pathing data from the predefined logical connection data that has been gathered by type;
        analyze a current state of the information processing system;
        determine, based on the current state being analyzed, that the current state of the information processing system indicates that the information processing system is in a state where physical connectivity information can be gathered;
        gather, in response to the information processing system being in a state where physical connectivity information can be gathered, actual physical connection data associated with the information processing system;
        format the predefined logical connection data that has been sorted and the actual physical connection data into a plurality of sortable tables, wherein at least a portion of the predefined logical connection data is formatted into a predefined channels table and at least a portion of the actual physical connection data is formatted into a node information table;

compare, in response to the predefined logical connection data and the actual physical connection data being formatted, the portion of the predefined logical connection data in the predefined channels table with the portion of the actual physical connection data in the node information table;

determine, based on the portion of the predefined logical connection data being compared with the portion of the actual physical connection data, if the portion of the predefined logical connection data substantially matches the portion of the actual physical connection data; and display, in response to determining that the portion of the predefined logical connection data fails to substantially match the portion of the actual physical connection data, at least one predefined logical connection that is associated with predefined logical connection data that: i) fails to substantially match the actual physical connection data to a user and/or ii) substantially matches the actual physical connection data to a user, fails to substantially match the actual physical connection data to a user.

9. The information processing system of claim 8, wherein the connectivity module is further adapted to gather actual physical connection data by:

extracting the predefined logical connection data from a configuration definition file that defines a set of logical connections associated with a system.

10. The information processing system of claim 8, wherein the connectivity module is further adapted to gather actual physical connection data by:

querying at least one node communicatively coupled to the information processing system for at least one of unique identifier information and current state information.

11. The information processing system of claim 8, wherein the connectivity module is further adapted to compare by:

determining that at least one communication link associated with the information processing system is broken; and updating the predefined channels table to indicate that the communication link is broken.

12. The information processing system of claim 8, wherein the connectivity module is further adapted to compare by:

determining that a misconfiguration exists with respect to a control unit associated with the information processing system; and updating the node information table to indicate that the misconfiguration exists.

13. A computer readable storage medium for verifying predefined connectivity for I/O devices, the computer readable storage medium comprising instructions for:

gathering current predefined logical connection data associated with an information processing system;

analyzing a current state of the information processing system;

determining, based on the analyzing, that the current state of the information processing system indicates that the information processing system is in a state where physical connectivity information can be gathered;

gathering, in response to the determining, actual physical connection data associated with the information processing system;

formatting the predefined logical connection data and the actual physical connection data into a plurality of sortable tables, wherein at least a portion of the predefined logical connection data is formatted into a predefined channels table and at least a portion of the actual physical connection data is formatted into a node information table;

comparing, in response to the formatting, the portion of the predefined logical connection data in the predefined channels table with the portion of the actual physical connection data in the node information table;

determining, based on the comparing, if the portion of the predefined logical connection data substantially matches the portion of the actual physical connection data; and displaying, in response to the determining, at least one predefined logical connection that is associated with predefined logical connection data that: i) fails to substantially match the actual physical connection data to a user and/or ii) substantially matches the actual physical connection data to a user.

14. The computer readable storage medium of claim 13, wherein the instructions for gathering actual physical connection data further comprise instructions for:

extracting the predefined logical connection data from a configuration definition file that defines a set of logical connections associated with a system.

15. The computer readable storage medium of claim 13, wherein the instructions for gathering actual physical connection data further comprise instructions for:

querying at least one node communicatively coupled to the information processing system for at least one of unique identifier information and current state information.

16. The computer readable storage medium of claim 13, wherein the instructions for gathering actual physical connection data further comprise instructions for:

determining a current state of the information processing system, wherein if the current state indicates that the information processing system is in a state where physical connectivity information can be gathered, gathering the actual physical connection data.

17. The computer readable storage medium of claim 13, wherein the instructions for comparing further comprise instructions for:

determining that at least one communication link associated with the information processing system is broken; and updating the predefined channels table to indicate that the communication link is broken.

18. The computer readable storage medium of claim 13, wherein the instructions for comparing further comprise instructions for:

determining that a misconfiguration exists with respect to a control unit associated with the information processing system; and updating the node information table to indicate that the misconfiguration exists.

* * * * *